United States Patent [19]
Heger et al.

[11] Patent Number: 5,592,745
[45] Date of Patent: *Jan. 14, 1997

[54] ELECTRONIC LEVEL DISPLAYING INCLINATION WITH REGARD TO INSTRUMENT LENGTH

[75] Inventors: Charles E. Heger, Saratoga; Gary R. Schultheis, Los Gatos, both of Calif.

[73] Assignee: Zircon Corporation, Campbell, Calif.

[*] Notice: The term of this patent shall not extend beyond the expiration date of Pat. No. 5,313,713.

[21] Appl. No.: 381,977

[22] PCT Filed: Aug. 11, 1993

[86] PCT No.: PCT/US93/07434

§ 371 Date: Feb. 13, 1995

§ 102(e) Date: Feb. 13, 1995

[87] PCT Pub. No.: WO94/04888

PCT Pub. Date: Mar. 3, 1994

[51] Int. Cl.⁶ .............................. G01C 9/06; G01C 9/18
[52] U.S. Cl. ............................ 33/366; 33/343; 73/1 E; 340/689
[58] Field of Search ................ 33/366, 340, 341, 33/343, 365, 492, 494, 700; 73/1 E; 340/689; 364/559

[56] References Cited

U.S. PATENT DOCUMENTS

| | | | |
|---|---|---|---|
| 3,233,235 | 2/1966 | Wright | 33/366 |
| 3,861,052 | 1/1975 | Siegfried | 33/366 |
| 4,551,921 | 11/1985 | Puyo et al. | 33/366 |
| 4,606,133 | 8/1986 | Mills | 33/366 |
| 4,641,434 | 2/1987 | Engler | 33/366 |
| 4,716,534 | 12/1987 | Baucom et al. | 33/366 |
| 4,912,662 | 3/1990 | Butler et al. | 33/366 |
| 4,932,132 | 6/1990 | Baker et al. | 33/366 |
| 5,031,329 | 7/1991 | Smallidge | 33/366 |
| 5,136,784 | 8/1992 | Marantz | 33/366 |
| 5,313,713 | 5/1994 | Heger et al. | 33/366 |

FOREIGN PATENT DOCUMENTS

| | | |
|---|---|---|
| 0123460 | 10/1984 | European Pat. Off. . |
| 0194087 | 9/1986 | European Pat. Off. . |
| 4035930 | 5/1992 | Germany . |
| 58-022910 | 2/1983 | Japan . |
| WO89/05961 | 6/1989 | WIPO . |
| WO90/11489 | 10/1990 | WIPO . |
| WO91/05985 | 5/1991 | WIPO . |

*Primary Examiner*—Christopher W. Fulton
*Attorney, Agent, or Firm*—Skjerven, Morrill, MacPherson, Franklin & Friel; Norman R. Klivans

[57] ABSTRACT

An electronic level includes a visual scale (similar to a ruler scale) having a number of parallel line segments. The inclination of the device is shown by illuminating various of the scale line segments on either side of a central line. When the device is at a null (typically level or plumb) only the central scale line is illuminated, indicating the inclination away from the null. Each scale line segment indicates a fraction of an inch of inclination per e.g. two feet of horizontal distance (the two feet being the level length in one version) which conforms to the normal use of such levels by building tradesmen. The level is calibrated by taking two readings with the level rotated 180° between readings. The readings are averaged and negative feedback is provided to the level sensor itself to null out any system mechanical or electrical offsets.

9 Claims, 11 Drawing Sheets

| SENSOR ORIENTATION | DATA RESULTS FOR ALL 16 FDAC SUBSTATES | | | | | | | | | | | | | | | | OPPERATIONAL DISPLAY SEGMENTS | TUNE | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | 1 | 2 | 3 | 4 | 5 | 6 | 7 | 8 |
| Out-of-Range CCW | 1 | 1 | 1 | 1 | 1 | 1 | 1 | 1 | 1 | 1 | 1 | 1 | 1 | 1 | 1 | 1 | XXXXXXXX | | | | | | | | |
| | 0 | 1 | 1 | 1 | 1 | 1 | 1 | 1 | 1 | 1 | 1 | 1 | 1 | 1 | 1 | 1 | XXXXXXX | X | | | | | | | |
| | 0 | 0 | 1 | 1 | 1 | 1 | 1 | 1 | 1 | 1 | 1 | 1 | 1 | 1 | 1 | 1 | XXXXXX | | X | | | | | | |
| | 0 | 0 | 0 | 1 | 1 | 1 | 1 | 1 | 1 | 1 | 1 | 1 | 1 | 1 | 1 | 1 | XXXXX | | | X | | | | | |
| | 0 | 0 | 0 | 0 | 1 | 1 | 1 | 1 | 1 | 1 | 1 | 1 | 1 | 1 | 1 | 1 | XXXX | | | | X | | | | |
| | 0 | 0 | 0 | 0 | 0 | 1 | 1 | 1 | 1 | 1 | 1 | 1 | 1 | 1 | 1 | 1 | XXX | | | | | X | | | |
| | 0 | 0 | 0 | 0 | 0 | 0 | 1 | 1 | 1 | 1 | 1 | 1 | 1 | 1 | 1 | 1 | XX | | | | | | X | | |
| | 0 | 0 | 0 | 0 | 0 | 0 | 0 | 1 | 1 | 1 | 1 | 1 | 1 | 1 | 1 | 1 | X | | | | | | | X | |
| "Level" | 0 | 0 | 0 | 0 | 0 | 0 | 0 | 0 | 1 | 1 | 1 | 1 | 1 | 1 | 1 | 1 | X | | | | | | | | X |
| | 0 | 0 | 0 | 0 | 0 | 0 | 0 | 0 | 0 | 1 | 1 | 1 | 1 | 1 | 1 | 1 | X | X | | | | | | | |
| | 0 | 0 | 0 | 0 | 0 | 0 | 0 | 0 | 0 | 0 | 1 | 1 | 1 | 1 | 1 | 1 | XX | | X | | | | | | |
| | 0 | 0 | 0 | 0 | 0 | 0 | 0 | 0 | 0 | 0 | 0 | 1 | 1 | 1 | 1 | 1 | XXX | | | X | | | | | |
| | 0 | 0 | 0 | 0 | 0 | 0 | 0 | 0 | 0 | 0 | 0 | 0 | 1 | 1 | 1 | 1 | XXXX | | | | X | | | | |
| | 0 | 0 | 0 | 0 | 0 | 0 | 0 | 0 | 0 | 0 | 0 | 0 | 0 | 1 | 1 | 1 | XXXXX | | | | | X | | | |
| | 0 | 0 | 0 | 0 | 0 | 0 | 0 | 0 | 0 | 0 | 0 | 0 | 0 | 0 | 1 | 1 | XXXXXX | | | | | | X | | |
| | 0 | 0 | 0 | 0 | 0 | 0 | 0 | 0 | 0 | 0 | 0 | 0 | 0 | 0 | 0 | 1 | XXXXXXX | | | | | | | X | |
| Out-of-Range CW | 0 | 0 | 0 | 0 | 0 | 0 | 0 | 0 | 0 | 0 | 0 | 0 | 0 | 0 | 0 | 0 | XXXXXXXX | | | | | | | | X |

ELECTRONIC LEVEL DISPLAYING INCLINATION WITH REGARD TO INSTRUMENT LENGTH

BACKGROUND OF THE INVENTION

1. Field of the Invention

This invention relates to an electronic level and specifically to the visual display and calibration of the level.

2. Description of the Prior Art

Electronic levels known in the art include that sold by Wedge Innovations Inc. and as disclosed in U.S. Pat. No. 4,912,662 issued Mar. 27, 1990 to Butler et al. (assigned to Wedge Innovations Inc.). Furthermore, such prior art electronic level displays show the inclination in degrees or percent slope, which are typically not the inclination measurements used by building tradesmen (carpenters, masons etc.).

Butler et al. also disclose at col. 9, lines 6–11:

The rise/run mode 122 is determined by first using the determine angle routine of block 146 and the display routine of block 148. The display function is calculated at twelve times the tangent of the angle determined by block 146. This gives the rise to run value of inches per foot.

Prior art devices thus often do not provide a satisfactory indication of how far from level or plumb one is in a mode useful to tradesmen who tend not to think in terms of inches per foot or percent slope or angular slope.

SUMMARY OF THE INVENTION

In accordance with the invention, an electronic level has a visual display that displays rise over run (deviation from a null) in terms of deviation from the null (level or plumb) in inches per the actual length of the level instrument (such as two or four feet). This advantageously corresponds to the way that such levels are used by tradesmen. It has been found that building tradesmen typically prefer either variable user offsets for transferring of arbitrary angles, or a series of fixed offsets such as ½ inch, 1 inch or 2 inches per linear two feet or 1 or 2 or 4 inches per linear four feet, which is readily converted to a deviation from a null (offset) per standard dimensions such as a ceiling height, door height, etc.

The visual display includes a number of parallel line segments resembling a typical ruler scale. When the device is at a null (level or plumb or at some other preselected inclination), only the central line segment is illuminated. When the device is inclined at an angle from the null, one or more of the line segments are illuminated starting from the center line segment. The more line segments that are illuminated starting from the center line segment, the greater the amount of inclination indicated. Each line segment in one embodiment indicates 1/64th inch of additional inclination per horizontal foot. The line segments on either side of the central line segment thus provide an indication of inclination in either direction, i.e. that the left end or right end of the device is inclined. Additionally, numerals are provided associated with the scale to show the amount of inclination per arbitrary length (such as two feet or four feet) related to the instrument length. Also included is a slope indicator and a numerical indicator for indicating the fixed offset mode. In fixed offset mode the null indication is provided not at level or plumb relative to the plane of gravity, but instead at some fixed angle thereto. Typically this would be for instance ½ or 1 or 2 inches per two feet or 1 or 2 or 4 inches per four feet which are measurements typically used in construction or readily converted thereto.

Levels utilizing bubble vials, also called carpenter's or mason's levels, have been in existence for many years. It is well known that to check the accuracy of these devices, the level is placed on a moderately level surface and the position of the bubble within the vial noted. The level is then rotated 180° in a horizontal plane and the bubble position again noted. If the level is accurate, the bubble displacement will be equal in both of the tested positions with reference to the pair of parallel lines inscribed on the bubble vial, thus showing that the reference lines are midway or the average of the two readings.

This concept can be extended to electronic levels. Butler et al. describes a calibration routine wherein electronically measured results are averaged in each of two 180° opposed positions, with the average of these two readings used as a calibrated reference by the level's microcomputer software routines. This technique is adequate when the level is calibrated and also used at a given temperature. If, however, the single sensor element of Butler et al. has any temperature sensitivity, this averaged result may no longer be valid or require temperature compensation.

An improved calibration technique disclosed herein utilizes negative feed back with differential sensor electrodes to the sensor itself to null out any system mechanical and/or electrical offset, by feeding back to the sensor a signal which nulls out all errors. Because the sensor utilizes two differential electrodes for any given position, once the error has been nulled out by the negative feedback, any temperature sensitivity of the sensor will affect both electrodes equally and thus the calibrated position of the level will not drift.

As in the prior art in checking a level's accuracy, two readings are taken as described above, with the required feedback to null the sensor stored in the level's microcontroller in each case. The readings are then averaged and this averaged feedback signal level is then the calibrated signal used to maintain the sensor's accuracy at the calibrated position (level, plumb, etc.).

DETAILED DESCRIPTION OF THE INVENTION

The level disclosed herein includes improvements over the level disclosed in commonly owned U.S. Pat. No. 5,083,383 issued Jan. 28, 1992 to Charles E. Heger and entitled "Electronic Capacitance Level With Automatic Electrode Selection". Also, certain features of the level disclosed in commonly owned U.S. patent application Ser. No. 07/810,739 filed Dec. 18, 1991 and entitled "Electronic Level With Display, . . . ", U.S. Pat. No. 5,259,118, issued Nov. 9, 1993, invented by Charles E. Heger are used herein. Both of the above patent documents are incorporated herein by reference. A capacitive sensing system in accordance with the present invention is described in U.S. Pat. No. 5,083,383 and therefore is not further described herein.

Display

Figure 1A:
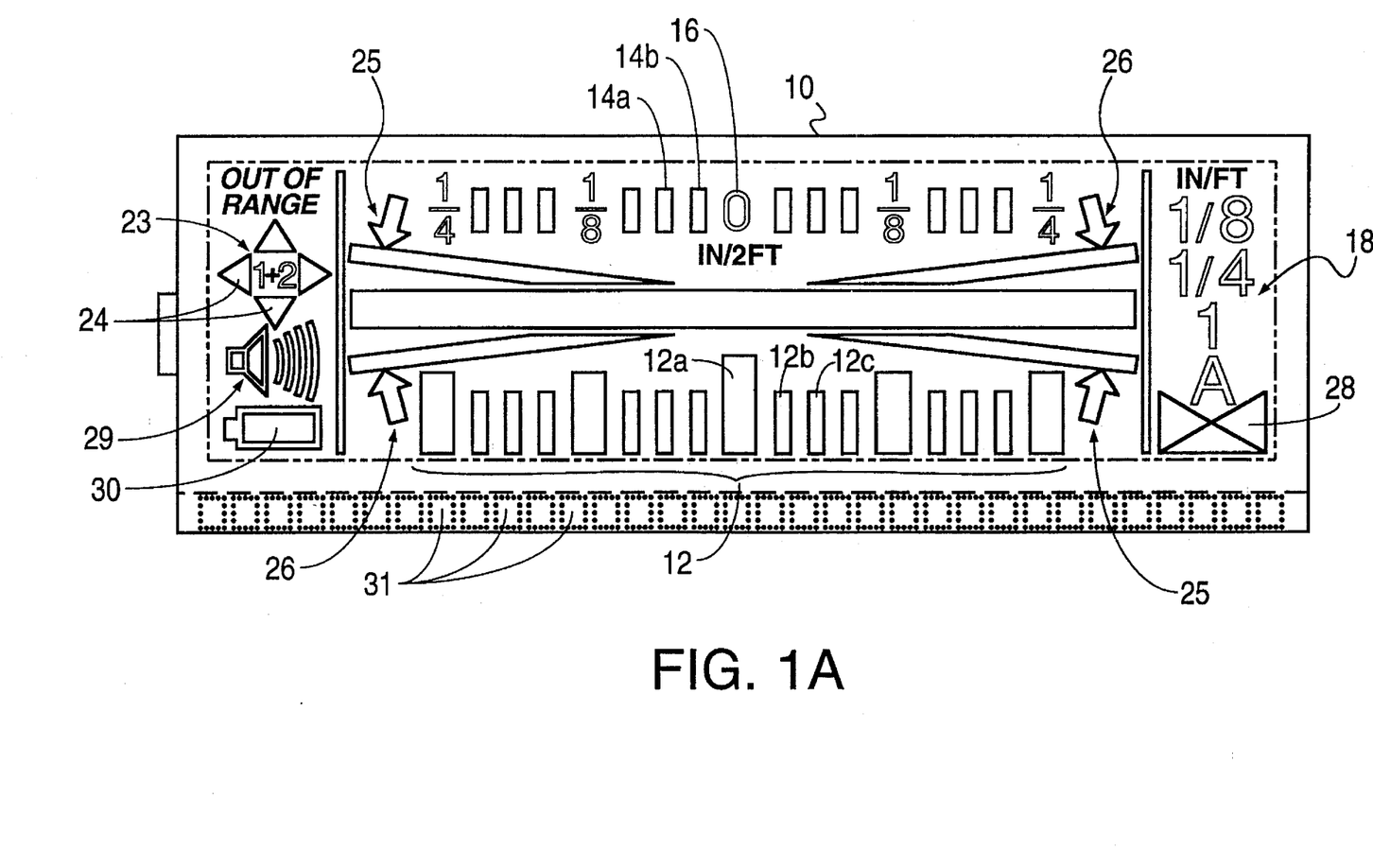
FIGS. 1A, 1B, 1C, show level displays in accordance with the invention.

FIG. 1A shows visual display 10 of the level in accordance with the invention. It is to be understood that display 10 is conventionally mounted on a convenient surface of the level, the mechanical structure of which is otherwise typical of that used in electronic levels which are well known commercially and sold for instance by Wedge Innovations and Zircon. The chief feature of display 10 is linear display scale 12 which includes as shown a number of parallel line segments including central line segment 12a with shorter line segments 12b, 12c etc. disposed on either side thereof. Every fourth of the line segments is a relatively long line segment such as 12e as used conventionally in ruler scales for convenience of reading the scale. Disposed immediately above the line segments of scale 12 are short line segments such as 14a and 14b and a central "0" indication 16. Scale segments 14 are always on (all segments illuminated). Only scale 12 changes with position. Scale 12's segments are visually compared to scale 14 to indicate the numerical deviation from null.

Also shown alongside line segments 14a, 14b are numbers ⅛, ¼ to indicate that each line segment 12a, 12b etc. is 1/32nd of an inch of inclination per two linear (e.g. horizontal) feet, as printed below the central "0" 16. The display of FIG. 1A is intended for use with a level having an overall length of two feet, thus providing an intuitive indication to the user that the displayed indication is relative to the particular length of the level. Thus four such line segments represent ⅛th of an inch of inclination relative to the overall 2 foot length of the level. The intention is that as one departs along scale 12 from the central line segment 12a, greater degrees of inclination are shown by illuminating each of the line segments from the center segment 12a out to one end or the other of the scale 12, depending on which end of the display is inclined high, mimicking the action of a conventional bubble vial. Thus an indication of out of null, i.e. typically out of level or out of plumb, is provided by the display 12 with the amount of deviation provided by association with the line segments 14a, 14b, etc. and associated numbers. This is especially advantageous for the building trades in the United States and other countries using the English measurement system.

Also provided in the righthand most portion of FIG. 1A is numerical annunciator 18 which includes an illuminated numerical fractions such as ⅛ or ¼. This mode indicating annunciator portion 18 of display 10 is thus dedicated to the mode indicating function and shows the various fixed offset or user offset modes as described above. The annunciator 18 is in IN/FT and the main display 12, 14 is in IN per 2 or 4 FT (see FIG. 1B). The annunciator 18 is standardized in IN/FT whereas the actual user display 12, 14 is in deviation from null related to the length of the unit. For instance, the user by pressing a mode button 22 in FIG. 2, can set the device to indicate a null position at ⅛ inch per foot of slope, or ¼ inch per foot of slope, or 1 inch per foot of slope. This fixed mode is annunciated by annunciator 18. If the level is in the user offset mode, annunciator 18 instead illuminates the letter A in annunciator 18. This indicates that the user has entered the user offset mode, by which one may indicate a null at any arbitrary angle.

Also provided is out of calibration indicator 23 (including a calibration step indicator) which by illuminating one or more of the four triangles 24 incorporated therein indicates that the device has invalid calibration at that particular inclination and valid information cannot be shown by the scale 12. (It is to be understood that the scale 12 has a maximum indication of out of null of only ¼ of an inch per two linear feet.) Another feature of display 10 is direction of rotation indicators 25 and 26. These are line and arrow indicators which indicate when the device is out of null and also in which direction one must rotate the device to achieve the null. Such a feature is described in the above-described patent application Ser. No. 07/810,739, now U.S. Pat. No. 5,259,118.

Also shown is ramp indicator 28 which indicates on which side of true level the device is oriented in while in the fixed offset mode. Loudspeaker icon 29 indicates activation and volume level of the tone generator. Icon 30 is the low battery indicator. Structures 31 are the electrical contacts for the LCD elements of display 10.

Figure 1B:
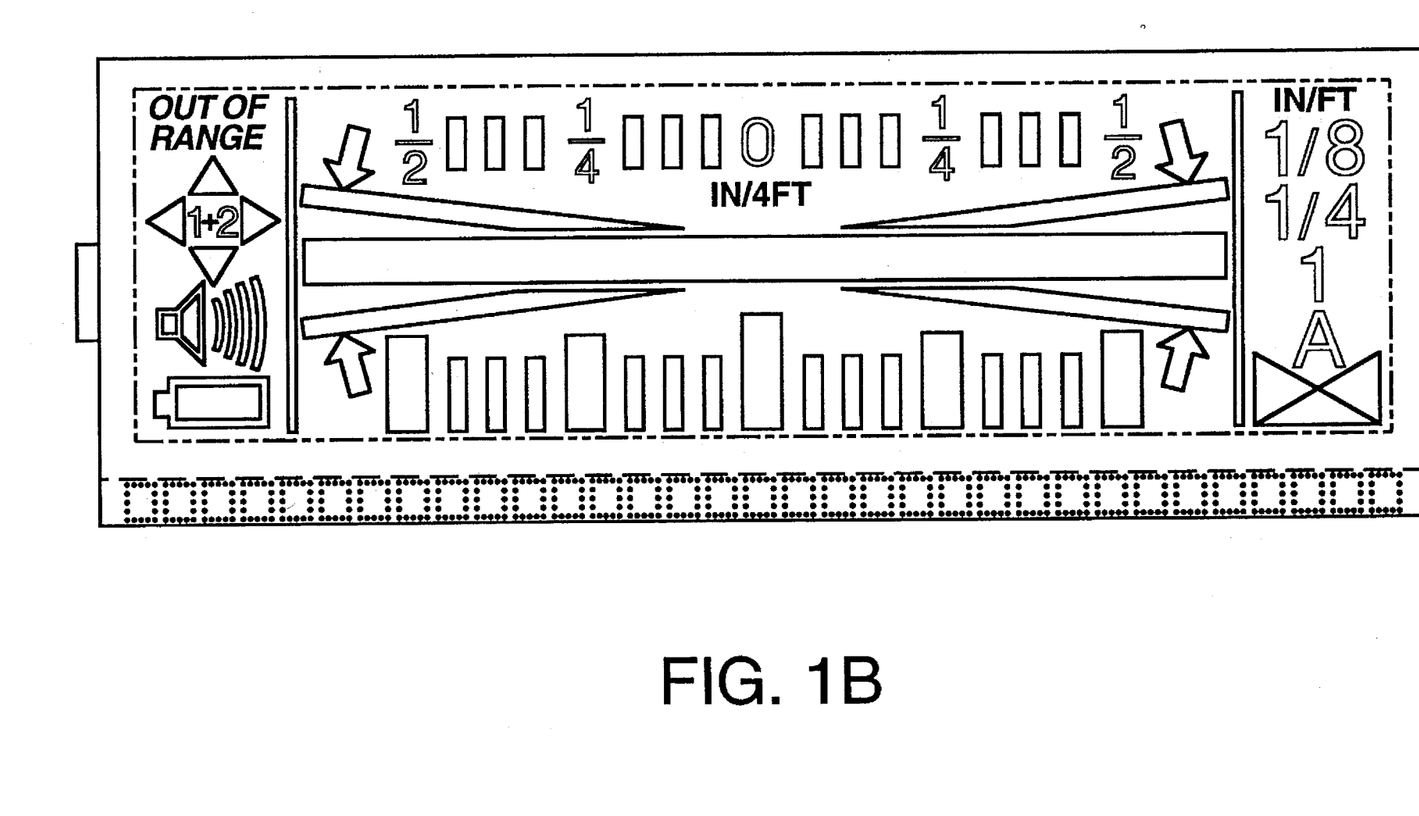

FIG. 1B shows a display identical to that of FIG. 1a, except that the upper scale (as shown) is for inclination per four feet of length, i.e., for a four foot long level, with the scale correspondingly being expanded to a ½ inch range of inclination.

Figure 1C:
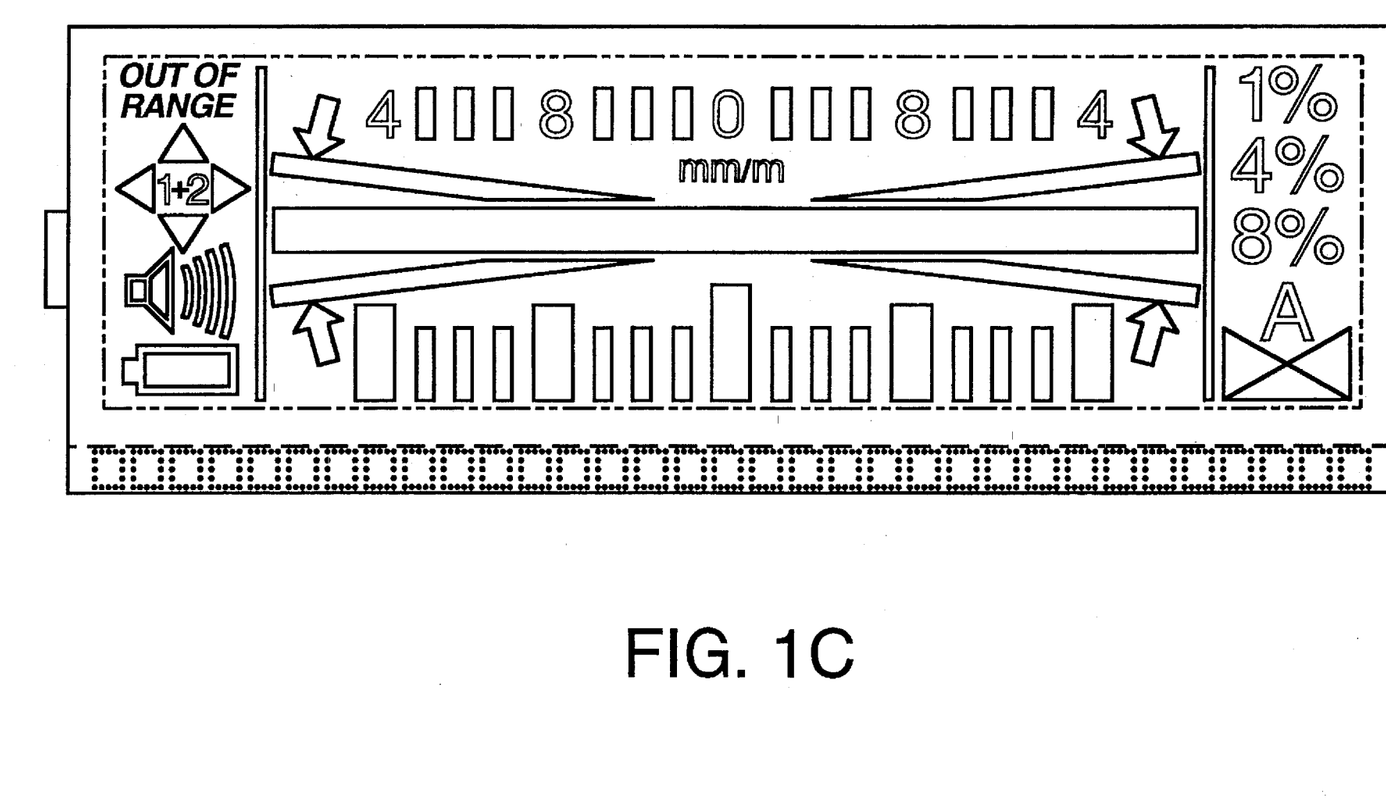

FIG. 1C shows a metric version of display 10, with the upper scale units being millimeter (mm) of inclination per meter (m) of length, and the righthand display portion 18 correspondingly showing percent slope for fixed offsets.

It is to be understood that all three versions (FIGS. 1A, 1B, 1C) operate similarly, with suitable calibration constants of the electronics (described below) for the relevant units.

It is also to be understood that the above described visual indications may be provided by a number of different electronic arrangements.

Circuitry

Figure 2:
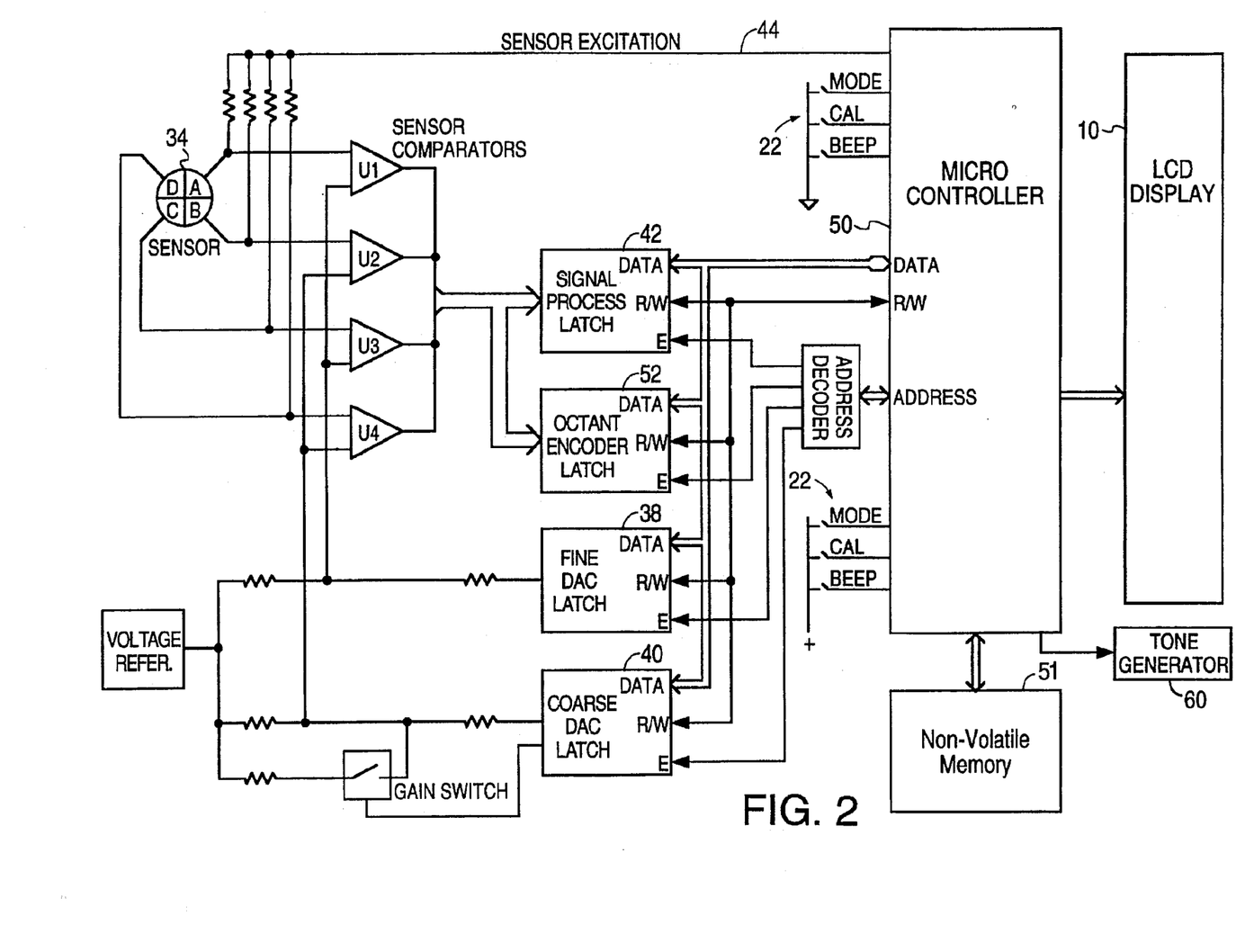
FIG. 2 shows a block diagram of the electronic circuitry in accordance with the invention.

The following description of electronic circuitry is of one embodiment of the invention and provides a rapidly responding visual display and tone processing, with accurate indication of inclination. A combination of an application specific integrated circuit (ASIC) and a programmed microcontroller is utilized for the electronic portions of the level in this embodiment, a block diagram of which is shown in FIG. 2. It is to be understood that one of ordinary skill in the art could write the microcontroller program in light of the detailed operating steps described hereinafter.

The four exponential R-C timing signals from the sensor 34 electrodes A to D are processed by conventional comparators U1, U2, U3, U4 as described in U.S. Pat. No. 5,083,383, utilizing the automatic electrode selection technique. The reference voltage for each pair of diagonally opposed comparators U1, . . . , U4 is derived from two digital-to-analog converters (DAC's) with sensor comparators U1 and U3 driven by an 8 bit DAC 38 called FDAC (fine DAC) and electrode comparators U2 and U4 driven by a four bit DAC called CDAC 40 (coarse DAC).

Figure 3A:
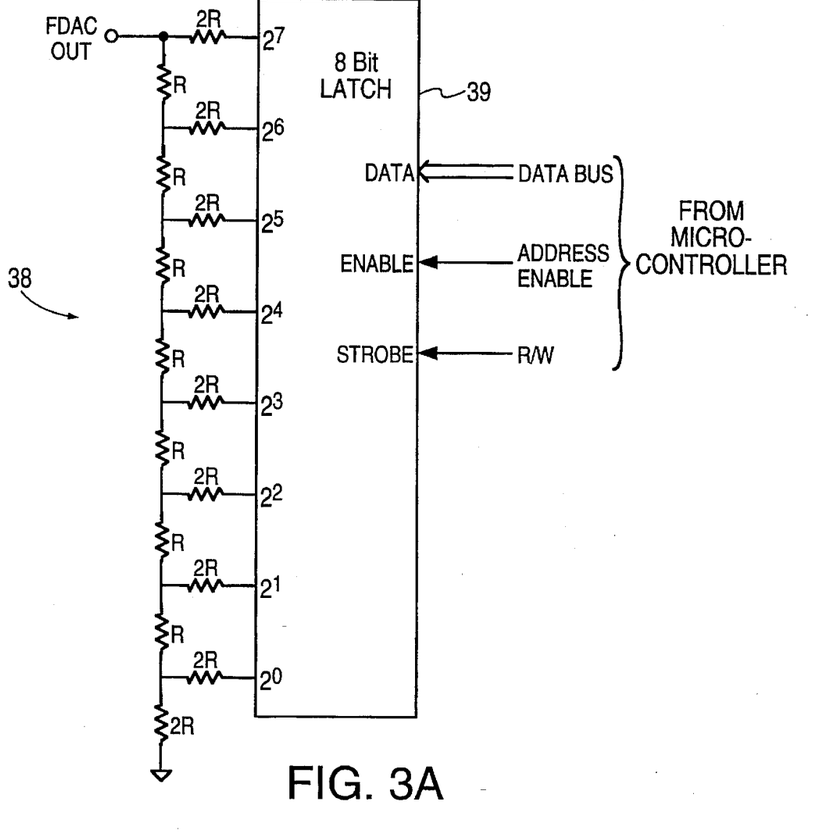
FIGS. 3A and 3B show detail of FIG. 2.
Figure 3B:
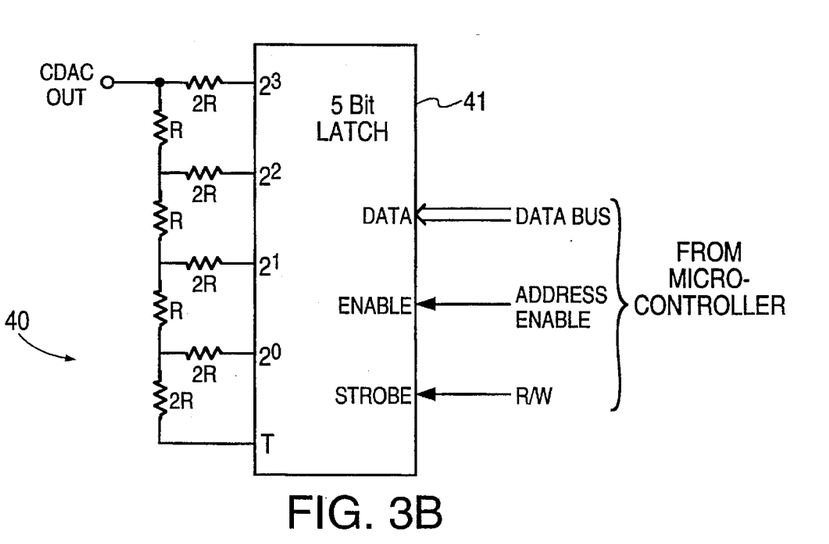

Each DAC 38, 40 includes respectively a latch circuit 39, 41 as shown in FIGS. 3A, 3B for retaining the data, and whose outputs are connected to an R-2R resistor network to derive the analog voltage. Schematics for the two DAC's 38, 40 are shown in FIGS. 3A, 3B, FIG. 3A showing FDAC 38 including latch 39 and FIG. 3B showing CDAC 40 including latch 41.

Averaging

The output of the Signal Processor Latch 42 will be a binary "1" or "0" after the sensor excitation pulse provided on line 44 from microcontroller 50, depending upon the orientation of the level.

To help remove system noise, the result of a number of excitation pulses are averaged by the program of microcontroller 50. In one version the number of cycles averaged is 100, with the following criteria: if the number of accumulated "1"'s is less than 45 over a 100 cycle period, the averaged data is a "0"; if the accumulated "1"'s is greater than 55 the average data is a "1"; if the accumulated "1"'s is between 46 and 54 the previous averaged data result will be used. This allows a 10% "noise band" to exist suppressing small physical (motional) and system noise which yields a "crisp" display and tone output.

Averaging Calibration

In normal mode operation (indicate level/plumb), the CDAC 40 is fixed at half scale by microcontroller 50 of FIG. 2 by writing the value 1000 binary into the CDAC latch 41. During user calibration for any given axis (Level, Plumb, etc.) the FDAC 38 is cycled by microcontroller 50 (which is a conventional 8 bit device with an 8 bit external bus) in a successive approximation routine (SAR) starting with the most significant bit (MSB) and the 8 bit result temporarily stored by the microcontroller 50. The level is then rotated 180° in the plane of the current working surface by the user and the FDAC 38 again cycled through the SAR and the result temporarily stored. These two temporary results are then averaged via a conventional math routine in the microcontroller 50 to ascertain their mean value. This mean value is then conventionally stored in the non-volatile memory 51 and becomes the calibration word (value) for the particular axis calibrated.

This routine is repeated for each of the four primary axes of the level.

Calibration arrows 24 of FIG. 1 indicate each axis calibration status:

solid on: not calibrated blinking: calibration in process off: calibrated

In addition to the calibration arrows 24, a numeral 1 or 2 in display 23 is displayed during the calibration cycle to alert the user to the calibration step in process i.e.:

"1": first cal step

"2": second cal step

After the calibration cycle for any axis is complete, both numerals 1 and 2 of display 23 are extinguished.

Octant Decoding

Figure 4A:
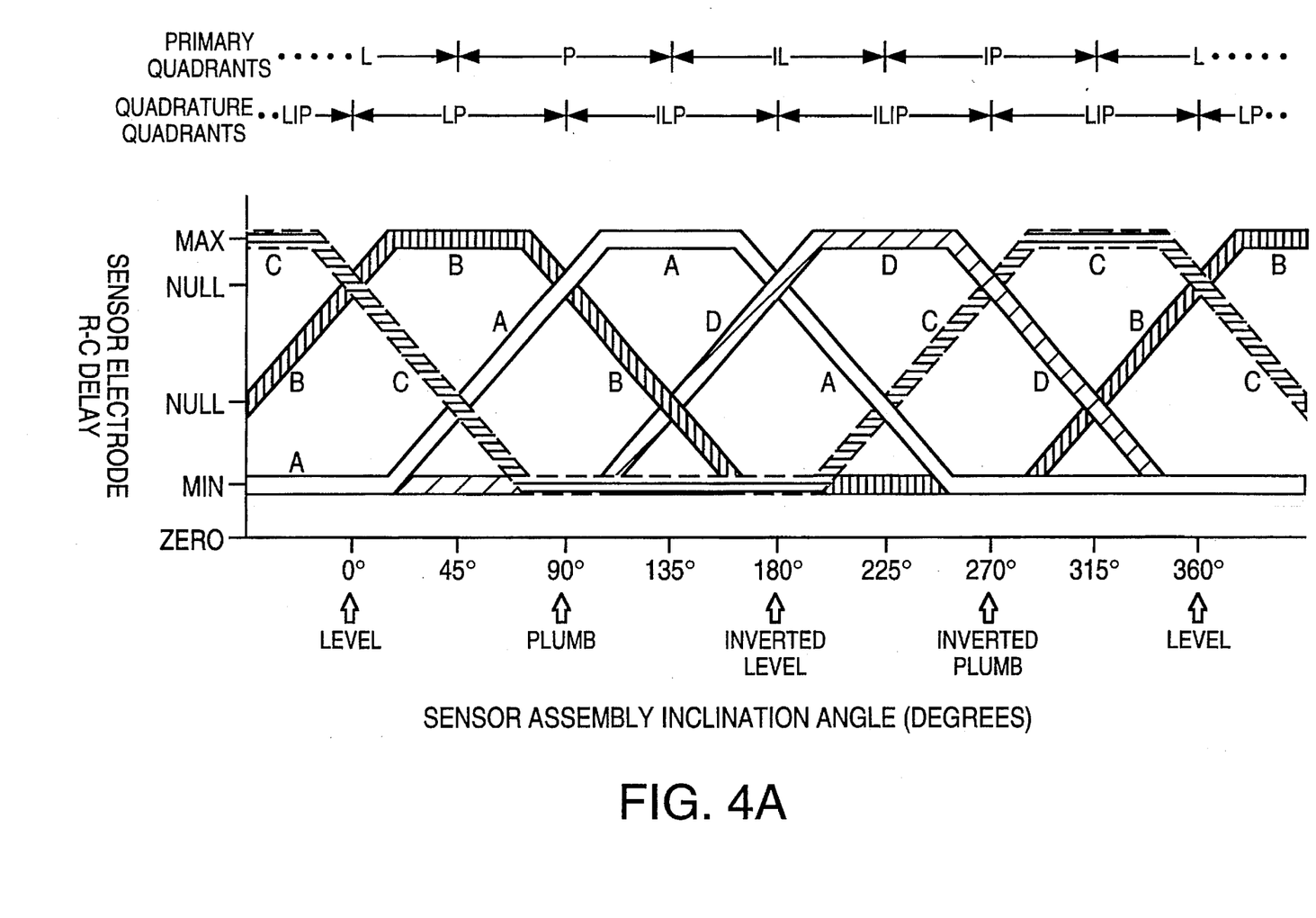
FIG. 4A shows octant decode timing.
Figure 4B:
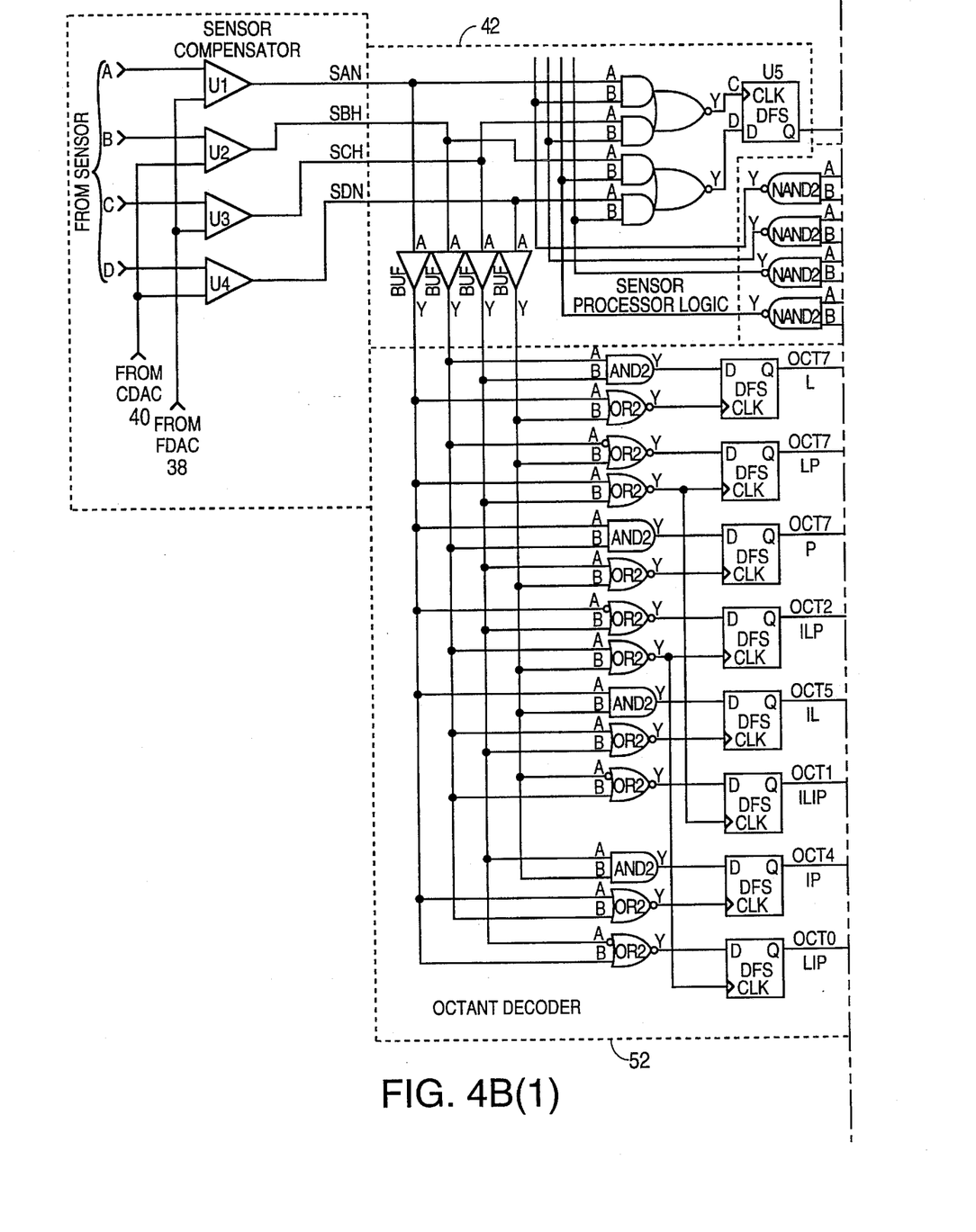
FIG. 4B containing FIGS. 4B(1) and 4(B)(2) shows sensor processing and octant decoding gate level logic circuitry.

The outputs of the four sensor comparators U1, . . . , U4 are decoded by octant decoder logic 52 to sense the octant within which the sensor 34 is currently oriented. This decoding, shown in FIGS. 4A and 4B is related to the technique described in U.S. Pat. No. 5,083,383 at FIG. 18. Decoding is accomplished by sensing the timing relationships of the four sensor 34 electrodes A, B, C, D. Sensor electrode timing relationships are shown in FIG. 4A along with the eight decoded "zones" each zone being 90° with four zones being in quadrature (45° shifted) from the other four zones. FIG. 4B shows the gate level electronic logic circuitry that accomplishes this. The four primary quadrant outputs, Level (L), Plumb (P), Inverted Level (IL) and Inverter Plumb (IP) from octant decoder 52 are used to select the appropriate quadrant for calibration word reading and writing. The other four quadrature quadrant outputs Level/Plumb (LP), Inverted-Level/Plumb (ILP), Inverted Level/Inverted Plumb (ILIP) and Level/Inverted Plumb (LIP) are used only during the user Offset Mode.

Display/Tone Processing

Control of the seventeen segment operation display 12 segments and eight tones as generated by tone generator 60 of FIG. 2 is under program control by the microcontroller 50. After a successful calibration cycle and storage of the calibration word for any particular quadrant the following sequence occurs:

Initially one starts with the eight bit calibration word, and binary 0000 (0 hex) is added to the calibration word, which represents a "level" display and tone, the sum of these two values resulting in the FDAC binary word sent to the FDAC 38. The data result from this FDAC 38 word is saved in a temporary register of the microcontroller 50. Binary 10 (2 hex) is now added to the FDAC word and the result is again saved. Three possible results from these two readings may occur. 1) If the result out of the averager of these two successive data bits is 01, no change in the display/tone occurs and the FDAC word is decremented by 10 binary. 2) If the result is 00, the display is incremented by one segment to the right and the FDAC word incremented by binary 10. 3) If the result is 11 the display is decremented by one segment and the FDAC word decremented by binary 10.

This process continues indefinitely, continuously updating the display and tracking the 0/1 null with two successive data pairs of data results. If the FDAC word reaches either ±16 decimal away from the calibrated "level" FDAC word, the FDAC is not incremented (decremented) any more until the data comes back into a ±16 decimal range of the FDAC calibration word. Each 2 bit "bin" of the FDAC word about a ±16 bit range of the calibration word corresponds to a display segment and tone frequency.

Assume that the physical position of the sensor 34 was such that the change in data from a 0 to a 1 occurs when the FDAC word equals the calibration word plus 0000 binary. When the FDAC word is then less than the calibrated word, the averaged data is a 0 until the FDAC word equals the calibration word. Thereafter the averaged data is a 1. This corresponds to a "level" condition and all 16 display segments on either side of the 17th center segment would be out, with only the center segment on, indicating "level".

If the sensor 34 were now slightly rotated counter-clockwise (CCW), the change in data from a 0 to a 1 would occur earlier in the 16 bin FDAC cycle, and those display segments corresponding to the FDAC bins where data was a 1 that are to the left of the center segment would be illuminated. If the sensor 34 was significantly rotated CCW from the "level" position (assuming that the quadrant has not changed) all eight display segments 12 to the left of the center segment 12a would be on. Therefor, seventeen unique states exist within each quadrant that describe the position of the sensor 34 relative to "level".

In addition each unique one-sided display state is associated with a certain tone from tone generator 60 for audible user feedback, with the exception that when all of the left or right eight "side-segments" of scale 12 are on, no tone output occurs. The same tone frequency is used for corresponding left and right display segments of scale 12. Representative states of scale 12 and the tones are shown in FIG. 5, showing the relationship for all sensor orientations between the FDAC word, averaged data output ("Data Results"), operational display segments 12, and tone output from tone generator 60.

Figure 5:
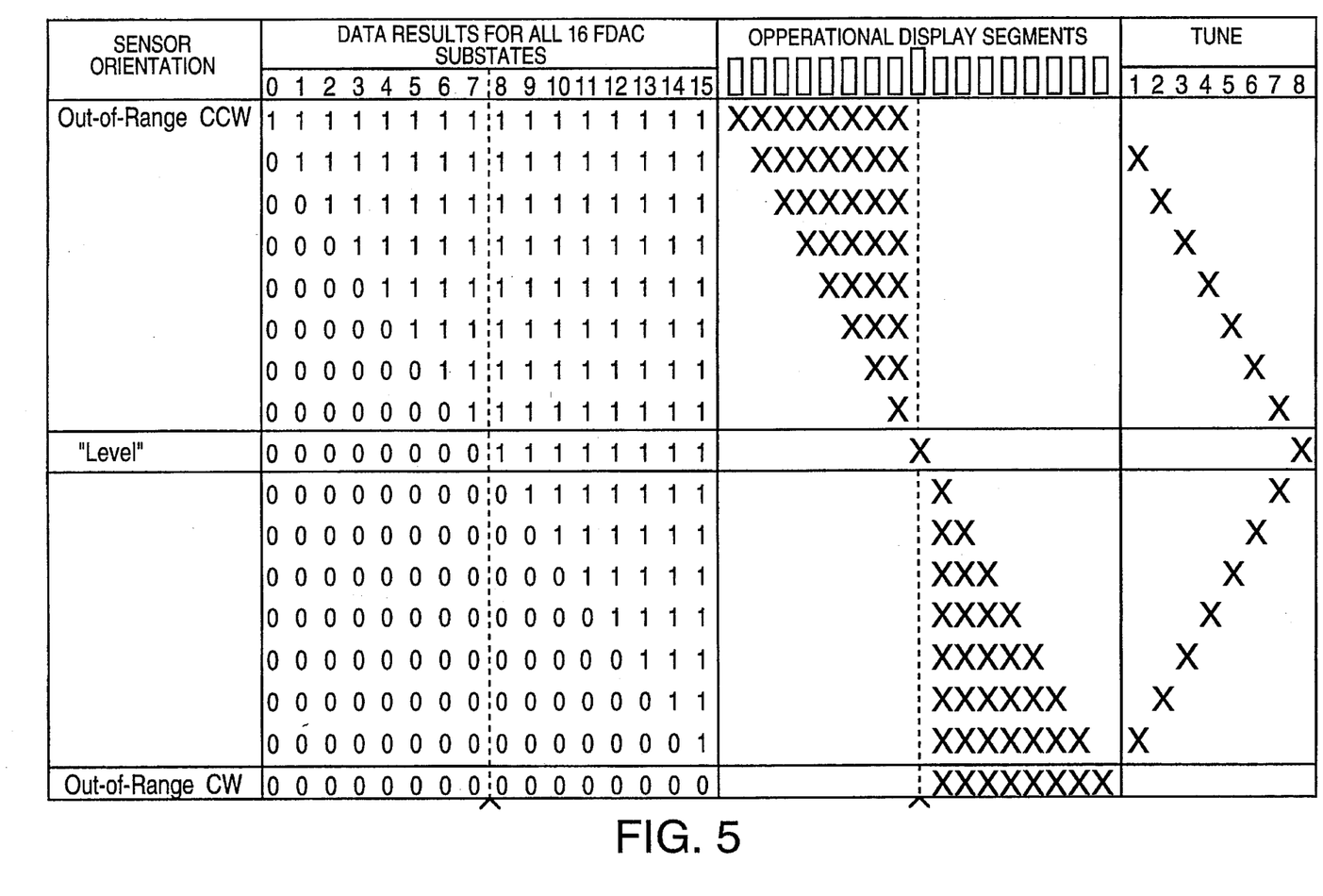
FIG. 5 shows sensor orientation and data results graphically.

Note in FIG. 5 that the relative polarity of the data bit for any FDAC step and the corresponding display segment actuation reverses from left of center to right of center. The microcontroller 50 program coordinates this change. The seventeenth "center" or "level" display segment 12a is enabled when the 0/1 data transition is between FDAC subset words 7 and 8. Again, the microcontroller 50 detects this condition.

The tones 1 through 8 are for example a B major musical scale with tone 1 being B (493.9 Hz) and tone 8 being B (987.8 Hz).

Each FDAC step represents a slope weight of 1/64"/two feet, so two FDAC steps represent 1/32"/two feet of slope (for the FIG. 1A version). Thus a calibrated display scale may be used representing the amount of slope offset from the true "level" position. The display scale 12 then has a range of ±1/4"/two feet.

All four primary quadrants of inclination are similarly treated, with the exception that the averaged data polarity is reversed in the plumb and inverted plumb quadrants. The microcontroller 50 again takes care of this detail. This polarity change is due to the physical relationship of pairs of sensor 34 electrodes A, B, C, D. For example, in the Level quadrant, electrodes B and C are active with B being on the right. But in the plumb quadrant, electrodes A and B are used with B now being on the left. This change from right to left changes the polarity of the resulting data.

Fixed Offset Mode

This mode is almost identical to the above described normal mode, with the exception that it is only valid in the Level quadrant and the CDAC 40 word is changed from range center (1000 binary) to some other word, causing an offset to occur.

The weighing of each CDAC bit is 1/8"/foot of slope, so that changing the CDAC word from 1000 to either 0111 or 1001 causes a 1/8"/foot offset. The level must now be rotated CW (or CCW) until a new display null or "level" is found. At this point, the level's slope relative to true level is 1/8"/foot off.

Thus, changing the CDAC word by two bits causes a 1/4"/foot offset or by eight bits, a 1"/foot offset. This requires seventeen states of the CDAC word (center range, ±8 bits, −8 bits). This is accomplished by putting a "1" into the normally "0" input of the CDAC R-2R resistor termination port of FIG. 3B. With the CDAC word at 1111 and the termination input at a 0, 15/16 of the output voltage is derived. However, when the termination port is at a 1, all five inputs to the resistor ladder network are a 1, causing the output to equal the supply voltage at the CDAC output or 16/16 of the supply voltage. Thus, going from 0/16 to 16/16 represents seventeen discrete voltage steps.

Since the level may be operated when inclined either CW or CCW from true level, two displays can exist for any given slope offset (i.e. +1/4/2 feet or −1/4/2 feet). Automatic detection of which side of true level is done by removing the CDAC offset temporarily, restoring the Normal Mode CDAC state of 1000, and determining on which side of true level the unit is oriented. With this information, the microcontroller can then select the appropriate CDAC offset word for either CW or CCW operation.

User Offset Mode

This mode allows the user to set a "level" display (null) condition anywhere within 360°. This is done by increasing the gain of the CDAC offset voltage steps to allow coverage of about ±50° within each quadrant. This ensures overlap with the adjacent quadrants so that no gaps occur between adjacent quadrants.

Figure 6:
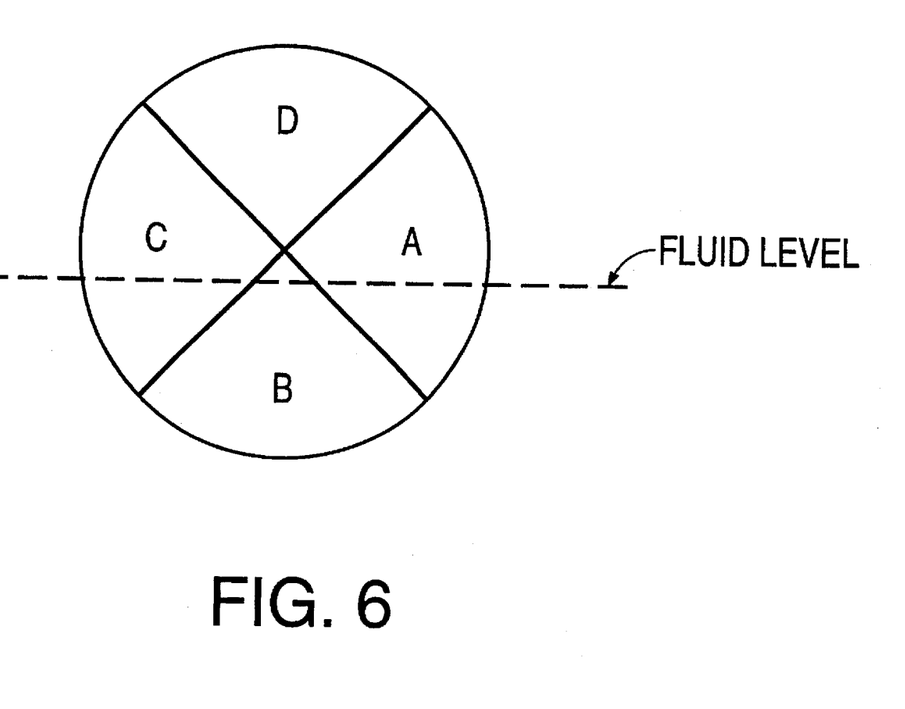
FIG. 6 shows wetting of the capacitive sensors in accordance with the invention.

Because a "level" or null condition could be set by the user very close to 45° away from true level or plumb, a special condition must be detected and corrected. If the sensor null condition were set at 45° away from true level the sensor plate condition would be as shown in FIG. 6, and electrodes A and C would be equally covered.

But the logic from the sensor comparators U1, . . . , U4 to the early/late flip-flop U5 in signal processor latch 42 requires that no opposite pair of electrodes are used together, due to the timing signals from electrode A or electrode B generating the early/late flip-flop's clock signal. Due to this OR'ing function, as the sensor was rotated CW away from the 45° orientation, fluid coverage of electrode A would increase and electrode B would decrease causing an increase in the clock signal timing delay. Similarly, if the sensor were rotated CCW from the 45° position, fluid coverage of electrode A would decrease and of electrode B increase, again causing an overall increase in the clock delay time. This would result in an increase in the clock signal regardless of the rotation away from 45° rather than an increase for one rotation direction and a decrease for the other which is what is wanted and what normally occurs.

To correct this, the quadrature quadrants are decoded (level/plumb), (inverted level/plumb, etc.), and this information is used along with the decoded primary quadrant information to disable one of the two opposite electrodes.

In operation, SAR's in microcontroller 50 for both the CDAC 40 and FDAC 38 are performed and the eight decoded quadrants (primary and quadrature) are then saved by the program of microcontroller 50. Even though the sensor 34 orientation could be very close to 45°, after both SAR's, a unique set of quadrant information will exist due to system noise being less than one LSB (least significant bit) of the FDAC 38. The following Table A shows the various sensor disable conditions along with the encoding of the eight quadrants to accomplish this:

TABLE A

| Range | Quadrant Logic | Sensor Disabled |
| --- | --- | --- |
| 0° to 45° | L•LP | A |
| 45° to 90° | P•LP | C |
| 90° to 135° | P•ILP | D |
| 135° to 180° | IL•ILP | B |
| 180° to 225° | IL•ILIP | C |
| 225° to 270° | IP•ILIP | A |
| 270° to 315° | IP•LIP | B |
| 315° to 0° | L•LIP | D |

Figure 7:
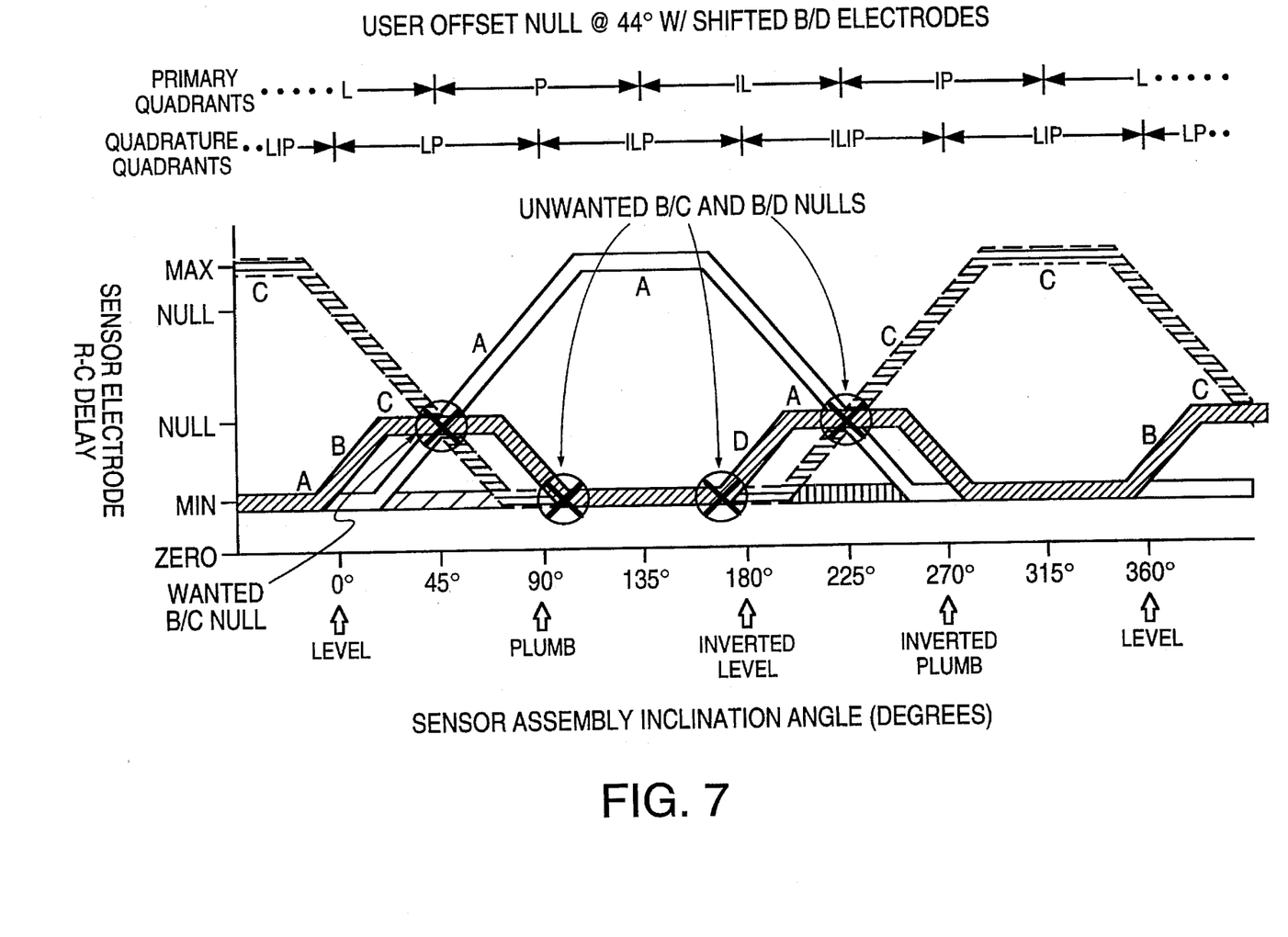
FIG. 7 shows extraneous sensor electrode nulls.

One other anomaly occurs while in user offset mode. Extraneous nulls occur at sensor orientations other than the desired position. Note in FIG. 4A that if the desired null was at 44°, electrode A would be disabled per the foregoing discussion and electrodes B and C would be the active pair determining the null point. The SAR would, for a null at this point, essentially shift the B/D electrode timing via the CDAC 40 output for this to occur. FIG. 7 shows this shifted electrode timing along with the undesired null points. The undesired null points are disabled by only allowing operation of the display in the 0/45° octant and either octant on both sides of the 0/45° octant by sensor disable logic 62 of FIG. 4B. This eliminates any ambiguous display.

The logic to accomplish this is two fold. First, the eight quadrants (primary and quadrature) are decoded and stored after the SAR routines. Second, the stored quadrant information is compared in real time to the current operating quadrants. Note that there are always two current, operating quadrants—one primary and one quadrature.

The gate level logic diagram of FIG. 4B shows how this is done. The signals on the octant memory bus OCTM, from the non-volatile memory 51 via the microcontroller 50 are compared to the locally generated octant information (OCT bus) by display enable logic 60 and this enables or disables the display 10 via line UODE, User Offset Display Enable.

For example, if the Octant Memory were stored at 44°, the two quadrants Level (L) and level/plumb (LP) would be a "1". These two signals are AND'd together in gate U6. The two operational quadrants L and LP are OR'd together in gate U7. Both these signals in turn are AND'd in gate U8 so that if either L or LP is operational, UODE is a "1" enabling the user display The other seven quadrant pairs are similarly treated.

This disclosure is illustrative and not limiting; further modifications will be apparent to one skilled in the art in light of this disclosure and are intended to fall within the scope of the appended claims.

We claim:

1. An inclination sensing device having a particular length and comprising:

a sensor for determining an inclination of the device relative to a null position; and a display for displaying the inclination as a measurement expressed in a fraction of a linear unit inclination per the particular length of the device.

2. The device of claim 1, wherein the linear unit is inches.

3. The device of claim 2, wherein the particular length is a multiple of two feet.

4. The device of claim 2, wherein the particular length is four feet.

5. The device of claim 1, the display further comprising an indicator of a direction in which the device must be tilted to achieve a particular predetermined null position.

6. The device of claim 1, wherein the display further comprises a dedicated mode-indicating portion for indicating in which one of a plurality of modes the display is operating, the mode indicating portion being for no other purpose.

7. An inclination sensing device having a particular length and comprising:

a sensor for determining an inclination of the device relative to a predetermined null point; and a display for indicating the inclination displayed in linear units per the particular length and also the direction in which the device must be tilted to achieve the predetermined null point.

8. A method of sensing inclination using a device of a particular length, comprising the steps of:

sensing the inclination;

providing a display showing the inclination as a measurement expressed in a fractional linear unit per the particular length; and displaying the sensed inclination on the display.

9. A method of calibrating an electronic inclination sensing device, having an inclination sensor located in a housing, comprising the steps of:

placing the device in a first position and determining by a successive approximation a first amount of feedback correction to the sensor necessary to null an output of the sensor;

placing the device in a second position and determining by a successive approximation a second amount of feedback correction to the sensor necessary to null an output of the sensor;

averaging a sum of the first and second amounts of feedback; and using the averaged sum to calibrate measurements of inclination.

* * * * *